(12) United States Patent
Peirce et al.

(10) Patent No.: US 8,761,390 B2
(45) Date of Patent: Jun. 24, 2014

(54) PRODUCTION OF CRYPTOGRAPHIC KEYS FOR AN EMBEDDED PROCESSING DEVICE

(75) Inventors: Kenneth L. Peirce, Grosse Pointe Farms, MI (US); Ansaf I. Alrabady, Livonia, MI (US); Sethu K. Madhavan, Canton, MI (US)

(73) Assignees: GM Global Technology Operations; General Motors, Detroit, MI (US)

( * ) Notice: Subject to any disclaimer, the term of this patent is extended or adjusted under 35 U.S.C. 154(b) by 1365 days.

(21) Appl. No.: 12/164,686

(22) Filed: Jun. 30, 2008

(65) Prior Publication Data

US 2009/0323967 A1    Dec. 31, 2009

(51) Int. Cl.
H04L 9/00 (2006.01)
H04L 9/08 (2006.01)
H04L 9/30 (2006.01)
H04K 1/00 (2006.01)
G06F 1/02 (2006.01)
G06F 7/58 (2006.01)

(52) U.S. Cl.
USPC ............... 380/46; 380/30; 380/44; 380/278; 708/250

(58) Field of Classification Search
USPC ........ 380/278, 279, 30, 44, 46; 713/168, 169, 713/171, 182
See application file for complete search history.

(56) References Cited

U.S. PATENT DOCUMENTS

| | | | |
|---|---|---|---|
| 5,144,667 A * | 9/1992 | Pogue et al. | 380/45 |
| 6,230,269 B1 * | 5/2001 | Spies et al. | 713/182 |
| 6,389,534 B1 * | 5/2002 | Elgamal et al. | 713/164 |
| 6,611,869 B1 * | 8/2003 | Eschelbeck et al. | 709/228 |
| 6,901,512 B2 * | 5/2005 | Kurn et al. | 713/164 |
| 7,111,322 B2 * | 9/2006 | Slick et al. | 726/5 |
| 7,113,594 B2 * | 9/2006 | Boneh et al. | 380/28 |
| 7,328,344 B2 * | 2/2008 | Chang | 713/175 |
| 7,356,394 B2 * | 4/2008 | Burgess | 701/29.3 |
| 7,409,569 B2 * | 8/2008 | Illowsky et al. | 713/323 |
| 7,664,269 B2 * | 2/2010 | Wood et al. | 380/284 |
| 7,703,073 B2 * | 4/2010 | Illowsky et al. | 717/121 |
| 7,818,574 B2 * | 10/2010 | Fayad et al. | 713/175 |
| 2002/0131592 A1 * | 9/2002 | Hinnant | 380/46 |
| 2008/0022122 A1 * | 1/2008 | Parkinson et al. | 713/185 |
| 2009/0259841 A1 * | 10/2009 | Laberteaux et al. | 713/156 |

OTHER PUBLICATIONS

Maxim Raya; Jean-Pierre Hubaux;"The security of vehicular ad hoc networks" SASN '05 Proceedings of the 3rd ACM workshop on Security of ad hoc and sensor networks. Nov. 2005. [retrieved from ACM database on Feb. 22, 2011].*

(Continued)

*Primary Examiner* — Saleh Najjar
*Assistant Examiner* — Feliciano Mejia
(74) *Attorney, Agent, or Firm* — Anthony Luke Simon; Reising Ethington P.C.

(57) ABSTRACT

A system and method for producing cryptographic keys for use by an embedded processing device within a manufactured product. A pseudo random number generator is seeded with entropy data gathered by the embedded device, and the result is used to generate a public-private key pair. The process can be carried out during manufacturing so that the public key of each manufactured product can be stored in a database along with a unique identifier for the embedded device associated with the key. In one particular example, a vehicle having an installed telematics unit uses the key generating process to self-generate keys using entropy data available to the vehicle.

17 Claims, 3 Drawing Sheets

(56) References Cited

OTHER PUBLICATIONS

Carl Ellison, Chris Hall, Randy Milbert, Bruce Schneier, Protecting secret keys with personal entropy, Future Generation Computer Systems, v.16 n.4, p. 311-318, Feb. 2000 [retrieved from Citeseer database on Feb. 22, 2011].*

Maxim Raya, Jean-Pierre Hubaux, "The security of vehicular ad hoc networks", SASN '05 Proceedings of the 3rd ACM workshop on Security of ad hoc and sensor networks ACM New York, NY, USA © 2005 [retrieved from ACM database Oct. 2, 2011].*

* cited by examiner

PRODUCTION OF CRYPTOGRAPHIC KEYS FOR AN EMBEDDED PROCESSING DEVICE

TECHNICAL FIELD

The present invention relates generally to techniques for generating cryptographic keys used in secure data communications and, in particular, to such techniques used for manufactured products having embedded processing devices.

BACKGROUND OF THE INVENTION

As computer electronics continue to reduce in cost and size, the applications for embedded processing devices are continuing to increase, and there now exists many types of manufactured products that contain some type of embedded processing device, whether microprocessor based or otherwise. Some embedded devices are designed to undergo data communication with one or more external, possibly remote devices. In some cases, it is desirable to establish authenticated, secure data communications in which the exchanged data is encrypted. Although various approaches can be used, cryptographic keys are perhaps most commonly used for this purpose. In public key cryptography, a public-private key pair is created with the public key then being available for use by anyone desiring encrypted communication with the holder of the private key. Digital certificates issued by a trusted third party (certificate authority) can also be used to authenticate the public key to a particular entity.

The generation of strong cryptographic keys typically involves the use of random data that cannot be later discerned or uncovered. For this purpose, general purpose computers such as desktop, laptop, and notebook personal computers can include entropy hardware or software engines that generate entropy data as a quantifiable form of random or near-random data for use in generating the cryptographic keys. This entropy data can be obtained in a variety of different ways, such as through software by, for example, timing the intervals between a user's keystrokes, detecting the user's movement of a mouse or other serial input device, or timing the arrival of packets at the computer from an attached network. Such data can also be obtained through entropy hardware engines in the computer that, for example, generate random data based on measured physical effects such as thermal noise (e.g., temperature variations about some given threshold). The cryptographic keys can then be generated using this entropy data since it is both transient and at least nearly truly random.

As applied to embedded processing devices, the generation of the cryptographic keys can be problematic because they typically do not have entropy hardware or software engines of the type found in personal computers. Instead pseudo random number generators (PRNG) are typically used. These PRNGs are generally implemented in software and require a seed value that is used to generate a pseudo-random number. This generated number is then used to produce the cryptographic keys. The generation of strong keys using PRNGs generally necessitates the use of a seed value that cannot later be discovered. For an embedded processing device having restricted computing capabilities, obtaining such a seed value can be problematic.

SUMMARY OF THE INVENTION

According to one aspect of the invention, there is provided a method of producing cryptographic keys for use in communicating with a manufactured product having an embedded processing device, comprising the steps of:

(a) providing a manufactured product having an embedded processing device that includes a pseudo random number generator (PRNG);
(b) obtaining entropy data;
(c) generating public and private cryptographic keys using the pseudo random number generator and the entropy data;
(d) storing the private key within the manufactured product;
(e) transmitting the public key from the manufactured product for storage in a database external to the manufactured product; and
(f) transferring possession of the manufactured product to another entity.

The method can be used in conjunction with a variety of manufactured products. In one embodiment, the manufactured product is a vehicle and the embedded device is a telematics unit installed in the vehicle.

In accordance with another aspect of the invention, there is provided a vehicle electronics system for self-generating cryptographic keys used for secure wireless communication with the vehicle. The vehicle electronics include a telematics unit, a communications bus connected to the telematics unit, and a plurality of vehicle system modules. The telematics unit has a processor, memory, and a cellular chipset, with the processor being operable to execute instructions stored in the memory and control wireless communication of cellular voice and data calls via the cellular chipset. At least some of the vehicle system modules are connected to the communications bus such that the telematics unit can receive data from the connected vehicle system modules. The telematics unit includes a pseudo random number generator and is operable under control of the processor to obtain entropy data from at least one independent data source external to the telematics unit and to generate cryptographic keys using the pseudo random number generator and the entropy data.

As used herein, "entropy data" need not be truly random data, but can be any data not readily discernible either externally of the manufactured product or after being collected and used in generating the keys. In the former case, this protects against key compromise by those not in possession of the manufactured article. In the latter, this protects against key compromise by anyone not having access to the entropy data at the time of key production. This is especially useful for manufactured products designed to generate the keys at the time of manufacturing, since cryptographic key production can be done under circumstances in which access to the device, and thus the entropy data, is prevented or at least controlled. Another benefit of producing the keys at the time of manufacturing is that the public key can be stored in a database in conjunction with one or more identifiers for the device, again under controlled circumstances.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and method described below enables the automatic generation of strong cryptographic keys by an embedded processing device at the time of manufacturing, before the product is released for distribution to end users. This is accomplished at least in part by supplying the embedded device with entropy data that it uses to seed a pseudo random number generator (PRNG) that is used to generate the keys. This entropy data can be obtained by the embedded device from any of a number of sources, including those both internal and external to the manufactured product. In the illustrated exemplary embodiment described below, the embedded device comprises a telematics unit installed in an automobile. However, it will be appreciated by those skilled in the art that the invention can be used in conjunction with any of a number of different embedded processing devices and manufactured products.

Communications System

Figure 1:
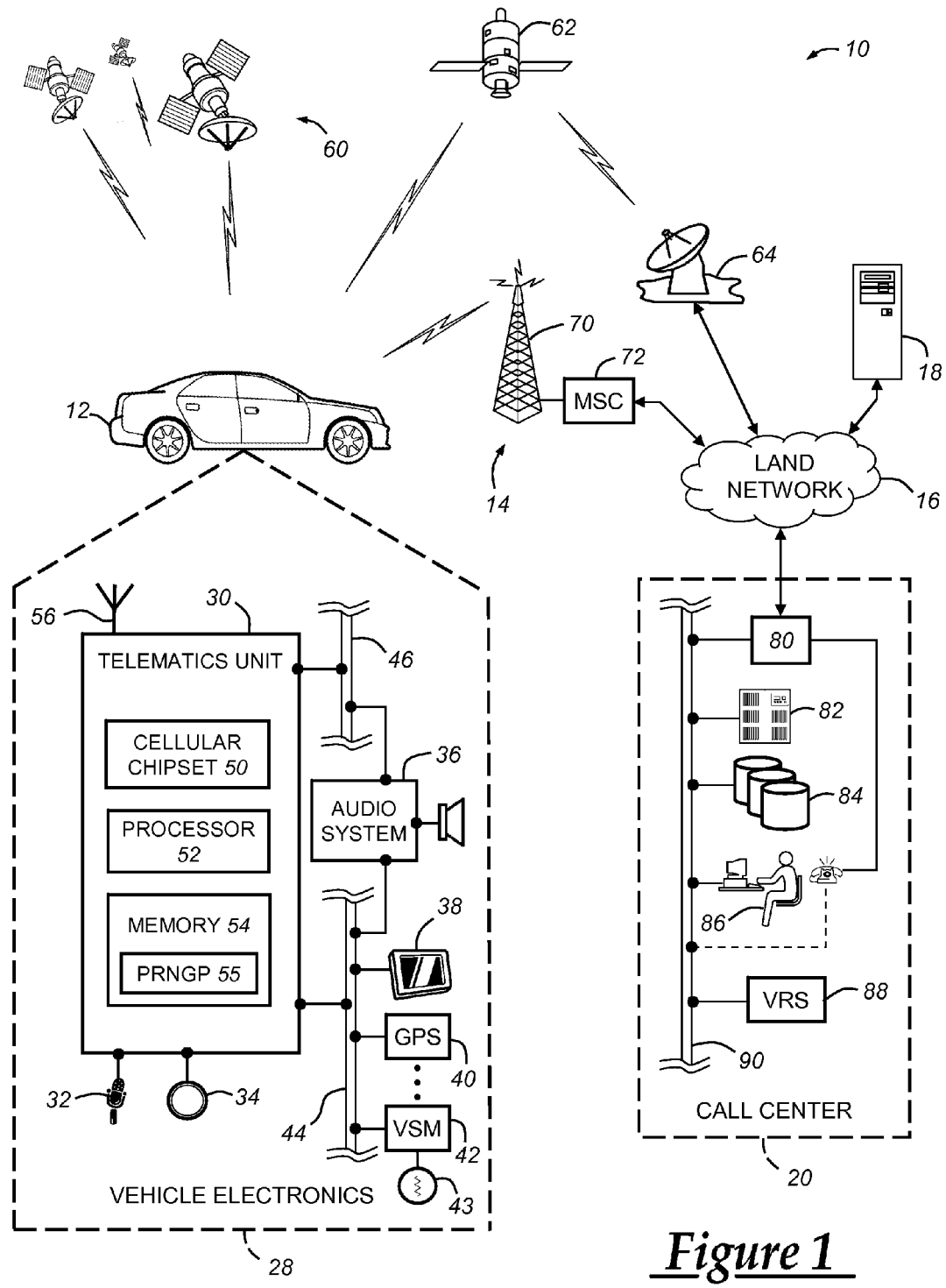
FIG. 1 is a block diagram depicting an exemplary embodiment of a communications system that is capable of utilizing the method disclosed herein.
Figure 2:
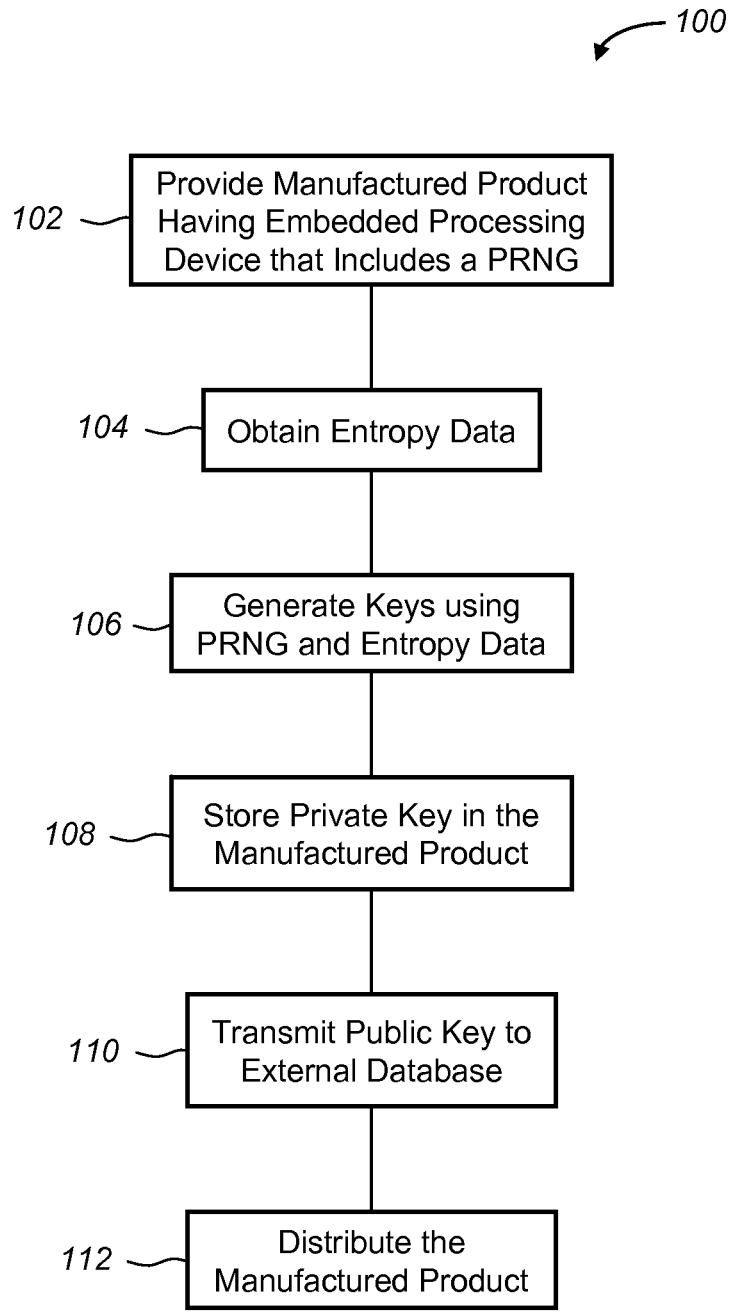
FIG. 2 is a flow chart of an exemplary embodiment of a method for producing cryptographic keys for an embedded processing device.
Figure 3:
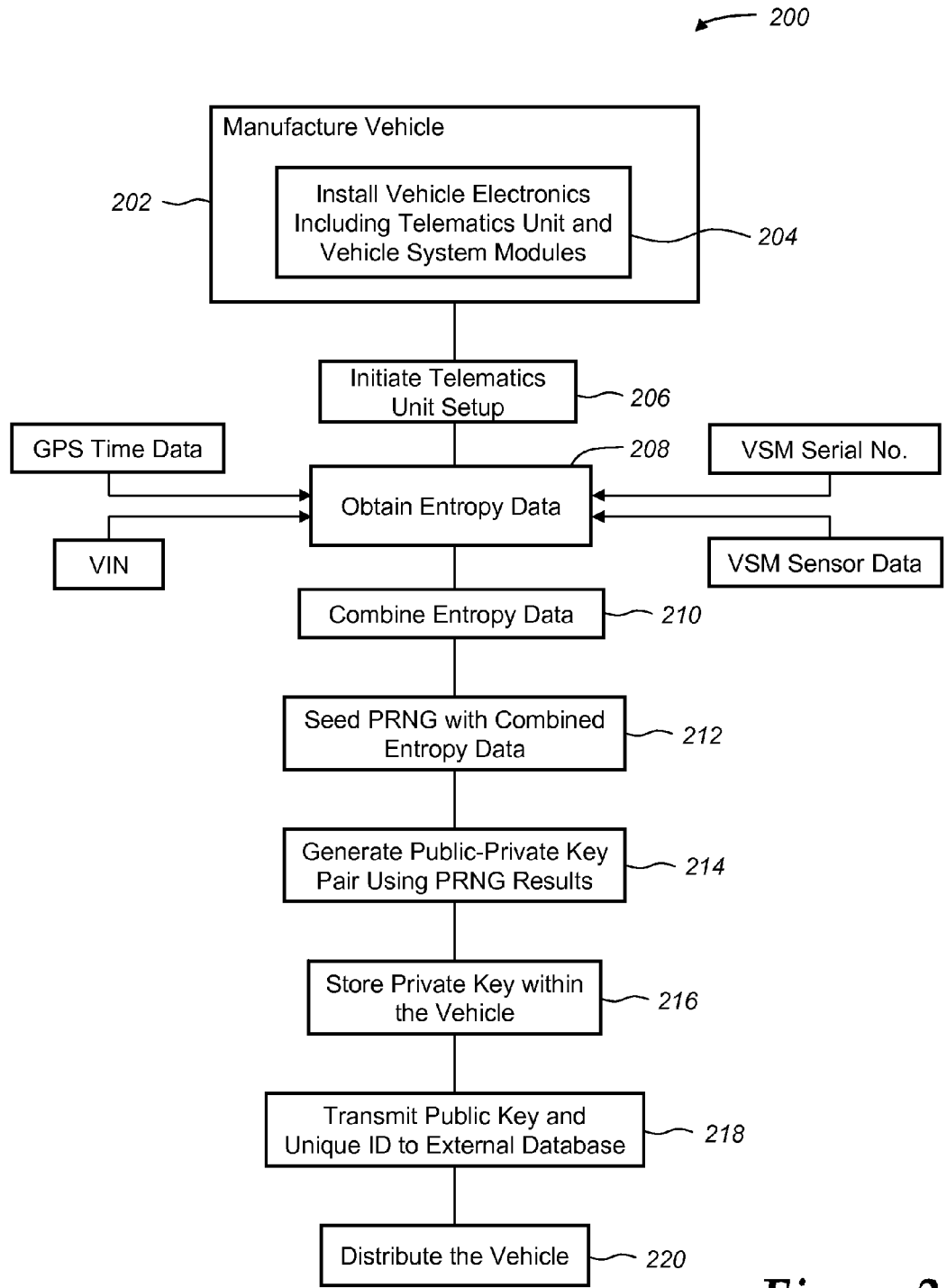
FIG. 3 is a flow chart of an exemplary embodiment of a method for producing cryptographic keys for use in communicating with a vehicle having an installed telematics unit.

With reference to FIG. 1, there is shown a vehicle 12 with its onboard electronics 28 that includes a telematics unit 30 constructed to carry out the cryptographic key generating methods of FIGS. 2 and 3. Also shown is an exemplary operating environment in the form of a mobile vehicle communications system 10 within which the telematics unit 30 is used in normal operation. Communications system 10 generally includes the vehicle 12, one or more wireless carrier systems 14, a land communications network 16, a computer 18, and a call center 20. It should be understood that the disclosed method can be used with any number of different systems and manufactured products and is not specifically limited to the telematics unit or operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processor 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Cryptographic Key Production Methods

Turning now to FIG. 2, there is shown a first embodiment 100 of a method of producing cryptographic keys. This embodiment is generic to the particular type of manufactured product and embedded device; thus, it is applicable to any manufacture having an electronics-based processing device incorporated therein. The process begins at step 102 wherein a manufactured product is provided having an embedded processing device that includes a pseudo random number generator (PRNG). Typically, this step will occur as a part of, or at the tail end of the manufacturing process such that this step, if not all of the steps of method 100, will be carried out while the product is still under the possession of the manufacturer. As one particular example, where the processing device is programmed to self-generate its keys, then steps 102-110 can be carried out after the manufactured product is fully completed, but prior to actual distribution. As will be appreciated, by performing this process for each manufactured product, a database of public keys and product identifiers can be built up as a part of the overall manufacturing process. Optionally, these steps can be carried out while the product is in the possession of an entity other than the manufacturer, such as by a dealer who has possession of the product prior to its delivery to an end user.

At step 104, the processing device obtains entropy data. This entropy data can come from one or more sources that provide data having either or both of the following attributes: (1) it is transient and not later discernible, or (2) it is internal to the manufactured product and not readily discernible without possession and analysis of the product. Although other types of entropy data can be used, these two types help minimize the likelihood of later discovery of the entropy data and thus, compromising of the keys generated using the entropy data. Preferably, two or more sources of entropy data are utilized and then combined, and even more preferably, those sources are independent data sources that provide unrelated data, meaning that that data sources are not controlled by the embedded processing device itself (they are independent of it) and that the data from the different sources are independent of each other (they are unrelated to each other). This helps increase the randomness of the combined entropy data being used and helps prevent later discovery of the data. The data can be combined in simple ways, such as by concatenation of the data, or in more complex manner, such as by applying a cryptographic hash function (for example, a SHA-1 function) to the combined data.

For the vehicle example shown in FIG. 1, examples of entropy data that can be used are measured transient events occurring on the vehicle, such as features of messages or other communications occurring on the communications bus 44, data from a vehicle system module (VSM) 42 such as data from a sensor 43, or GPS satellite time data (normally used for determining location coordinates) that are received from the GPS module 40. Other, non-transient, but unique data can be used as entropy data, such as serial numbers from onboard devices, the vehicle VIN, an assigned mobile number for the telematics unit or network node address. Other such sources of entropy will become apparent to those skilled in the art.

Where, as is often the case, the embedded processing device is manufactured as a separate item by one company or organization and then assembled or otherwise installed in the manufactured item by another company or organization, it is preferable to have a portion of the entropy data come from each of these two sources. This helps minimize the possibility that the keys can be compromised since no one source is likely to know all of the entropy data used to generate the keys. In the vehicle telematics example, a supplier of the telematics unit module can include in the module an entropy buffer containing one source of entropy data, such as any of a number of the different examples of entropy data described above. Then, after the telematics module has been supplied to the automotive company that produces the finished vehicle, a second source of entropy data can be added by the automotive manufacturer. Again, either or both of these steps can be carried out automatically by the telematics unit programming when it is powered up. Once both pieces of entropy data are obtained by the telematics unit, it combines them in any suitable fashion as noted above. Thus, using this approach, the manufacturer of the embedded processing device will not itself be able to recreate the keys, and this approach can also be used to prevent the manufacturer of the end product from being able to recreate the keys.

Using the entropy data, the next step 106 in the process is generation of the cryptographic keys using the PRNG within the embedded device. Suitable PRNG software programs are known and can be incorporated into the embedded processing device. The entropy data is used as a seed value for the PRNG, which will yield a nearly random number suitable for use in generating strong cryptographic keys. Once the keys have been generated, the entropy data used to seed the PRNG process is preferably erased from any memory in which it had been held. The use of the output of the PRNG to generate various types of keys is known, including asymmetric public-private key pairs. These keys can be used either in a web of trust scheme, or can be utilized using public key infrastructure wherein the public key can be issued by a certificate authority.

For public-private key pairs, once the keys are generated, the private key is stored in the manufactured product, such as in memory included within the embedded device. This is shown at step 108. Then, the public key is transmitted electronically (for example, wirelessly) from the manufactured product and stored in an external database, step 110. A unique ID of the manufactured product or its embedded device can also be stored in the database and associated with the public key so that subsequent communications can be targeted individually to that particular product. For example, a serial number or MAC address for the embedded device can be used. At this point, the generation of the keys is complete and the manufactured product can be distributed by, for example, transferring possession of the product to another entity.

Turning now to FIG. 3, there is shown a second embodiment 200 of a method for producing cryptographic keys, with this method being directed more specifically to a vehicle application, wherein the keys are used for communicating wirelessly with a telematics unit of the vehicle. The vehicle electronics 28 shown in FIG. 1 and, particularly, the telematics unit 30 can be used to carry out this method. The first step is to manufacture the vehicle 12 at step 202 including its vehicle electronics 28 with the telematics unit 30 being installed as original equipment, as indicated at step 204. Then, as a part of the initialization of the telematics unit at step 206, the cryptographic key generating process is begun which first involves obtaining the entropy data at step 208. Preferably, both the gathering of entropy data and the key generation is carried out under control of the telematics unit 30 and, in particular, by the telematics unit processor 52. As discussed above, a variety of different data sources can be used for the entropy data. This can include one or more of the following sources shown in FIG. 3; namely, GPS time data obtained from one or more GPS satellites 60, the vehicle VIN, a serial number for the telematics unit 30 or other VSM 42, or sensor data such as from the vehicle sensor 43 shown in FIG. 1. These data sources are mostly external to the telematics unit (embedded device), but not to the vehicle (manufactured product). However, in other embodiments, data external to both can be used, and such data can be obtained either via a wired connection to the vehicle or wirelessly via, for example, the telematics unit and its cellular chipset, or using some other wireless technology. Thus, entropy data of a more truly random nature can be supplied to the vehicle from the manufacturer as a part of initially configuring the telematics unit with its cryptographic keys. However obtained, this entropy data, if from more than one source, is combined at step 210 using any of the techniques discussed above in connection with FIG. 2.

As shown in FIG. 1, the telematics unit includes a PRNG program (PRNGP) 55 which can be stored in the telematics memory 54 and executed by the processor 52. Thus, at step 212, the PRNG can be seeded with the entropy data and the near-random number that is generated is then used in a known manner at step 214 to generate a public-private key pair. The private key is stored in the vehicle, such as in the telematics memory 54 at step 216, and the public key is transmitted at step 218 to an external database along with at least one unique identifier associated with the telematics unit. Transmission of the public key can be done wirelessly using the cellular chipset 50 or using some other communication approach, as will be known to those skilled in the art. The external database that stores the keys and associated IDs can be, for example, database 84 that is maintained at the call center 20. Once the keys have been generated and stored in their respective locations, the vehicle can then be distributed to a dealer or end customer, as indicated at step 220. The keys can then be used to establish secure communication between, for example, the call center 20 and the vehicle 12.

For the vehicle telematics unit 30, because of its wireless data communication capability with the call center 20 and other remote facilities, the key generation process can be carried out automatically without any human initiation or intervention. Thus, for example, the method can be a part of an initialization or setup routine that is automatically run by the telematics unit prior to its use in service. This automatic, self-generation feature of the illustrated embodiment, in conjunction with the act of performing the process prior to relinquishing possession to an end user, allows a complete database of keys and vehicles to be automatically set up and populated as a part of the manufacturing stage.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of producing cryptographic keys for use in communicating with a manufactured product having an embedded processing device, comprising the steps of:

(a) providing a manufactured product having an embedded processing device that includes a pseudo random number generator;

(b) obtaining entropy data from non-transient unique data located on a vehicle or from the output of one or more vehicle system modules located apart from and communicatively linked to the embedded processing device;

(c) programming the manufactured product to generate both public and private cryptographic keys using the pseudo random number generator and the entropy data;

(d) storing the private key within the manufactured product;

(e) transmitting the public key from the manufactured product for storage in a database external to the manufactured product; and (f) transferring possession of the manufactured product to another entity.

2. The method of claim 1, wherein the manufactured product is an automobile and the embedded processing device is a telematics unit installed in the automobile as original equipment.

3. The method of claim 1, wherein steps (b) through (d) are carried out prior to step (f) as a part of an initialization routine for the embedded processing device.

4. The method of claim 1, wherein the obtained data comprises a sensor reading obtained from the vehicle system module.

5. The method of claim 1, wherein the obtained data comprises a time value.

6. The method of claim 1, wherein the obtained data comprises a unique identifier obtained from the vehicle system module.

7. The method of claim 1, wherein step (b) further comprises generating the entropy data by obtaining data from a plurality of data sources accessible by the embedded processing device and combining the obtained data together.

8. The method of claim 7, wherein the step of combining the obtained data further comprises performing a cryptographic hash function on the obtained data.

9. The method of claim 1, wherein step (e) further comprises transmitting the public key along with a unique identifier for the embedded processing device.

10. The method of claim 9, wherein the unique identifier is a MAC address associated with the embedded processing device.

11. The method of claim 9, wherein the unique identifier is a serial number associated with the embedded processing device.

12. A method of producing cryptographic keys for use in communicating with a vehicle having an installed telematics unit, comprising the steps of:

(a) manufacturing a vehicle, including the step of installing a telematics unit in the vehicle such that the telematics unit is in communication with one or more vehicle system modules;

(b) obtaining entropy data under control of the telematics unit by collecting unrelated data from at least two different data sources, wherein at least one of the different data sources is manufactured by a different company or organization than the telematics unit;

(c) seeding the pseudo random number generator within the telematics unit with the entropy data;

(d) programming the telematics unit to generate both public and private cryptographic keys using the pseudo random number generator;

(e) storing the private key within the vehicle;

(f) transmitting the public key to an external database along with at least one unique identifier associated with the telematics unit; and (g) distributing the vehicle.

13. A vehicle electronics system for self-generating cryptographic keys used for secure wireless communication with the vehicle, comprising:

a telematics unit having a processor, memory, and a cellular chipset, wherein said processor executes instructions stored in said memory and controls wireless communication of cellular voice and data calls via said cellular chipset;

a communications bus connected to said telematics unit; and a plurality of vehicle system modules, at least some of which are connected to said communications bus such that said telematics unit can receive data from said connected vehicle system modules;

wherein said telematics unit includes a pseudo random number generator and is operable under control of said processor to obtain entropy data from non-transient unique data located on the vehicle or from a vehicle system module carried by the vehicle and to generate a public key and a private key using said pseudo random number generator and said entropy data.

14. The vehicle electronics system as set forth in claim 13, wherein said entropy data comprises at least in part sensor data obtained from one of said vehicle system modules.

15. The vehicle electronics system as set forth in claim 13, wherein said entropy data comprises at least in part a unique identifier obtained from one of said vehicle system modules.

16. The vehicle electronics system as set forth in claim 13, wherein said telematics unit is operable under control of said processor to obtain unrelated data from at least two independent data sources, at least one of which is external to said telematics unit.

17. The vehicle electronics system as set forth in claim 13, wherein said telematics unit is operable under control of said processor to save said private key in memory and transmit said public key wirelessly via said cellular chipset.

* * * * *